May 20, 1958     L. E. HARRISON     2,835,296
SMEAR REMOVER FOR MEAT SLICING MACHINE
Filed April 2, 1953
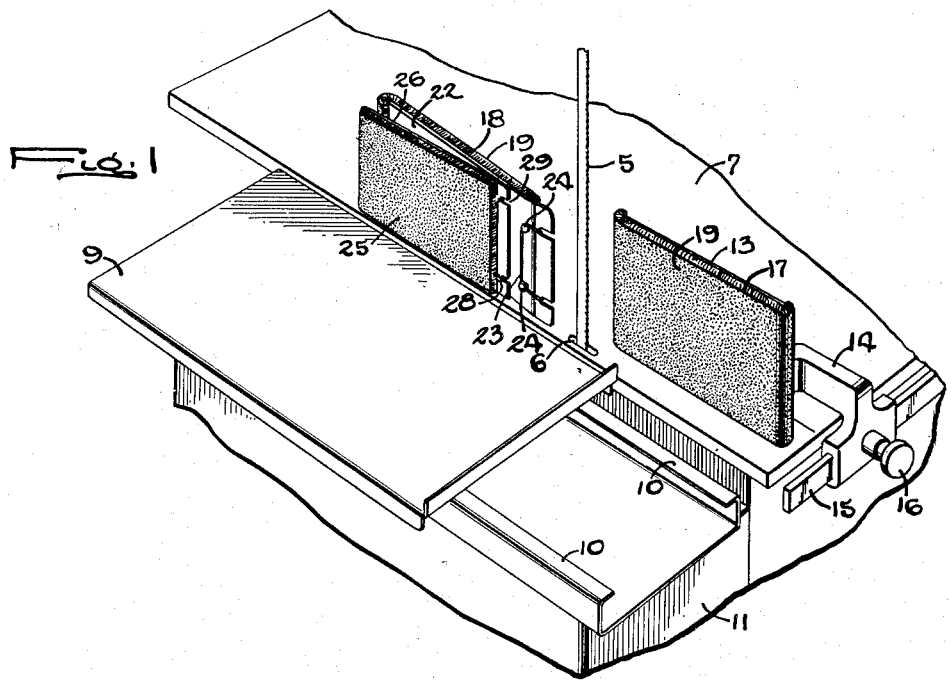
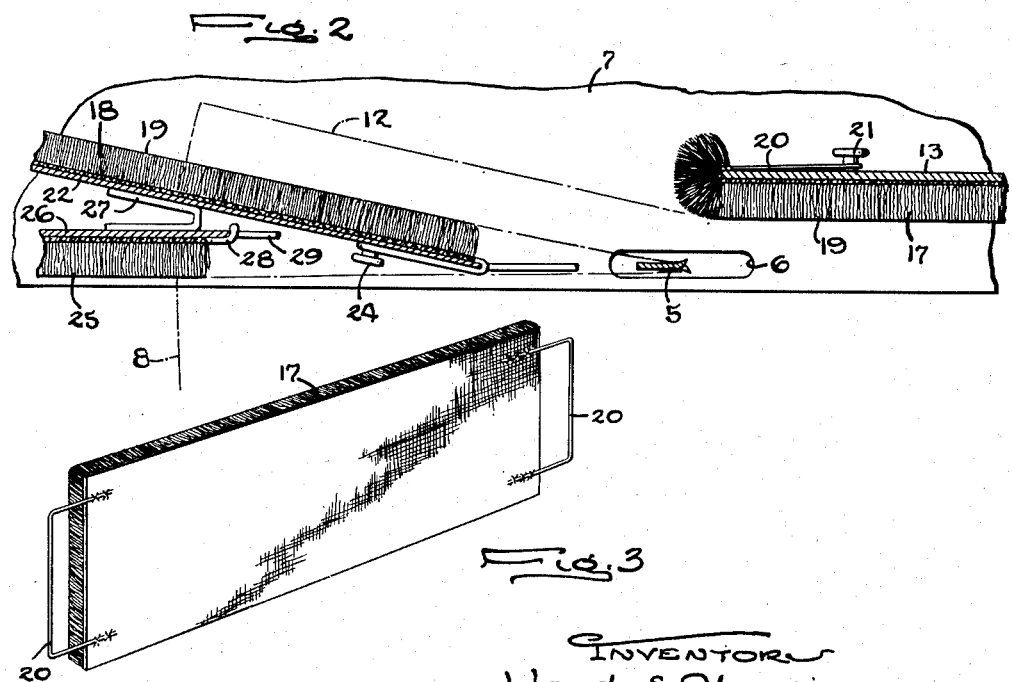
INVENTOR
Lloyd E. Harrison
By Carlson, Pitzner, Hubbard & Wolfe
ATTORNEYS

2,835,296

SMEAR REMOVER FOR MEAT SLICING MACHINE

Lloyd E. Harrison, Loves Park, Ill., assignor of one-half to Ernest J. Zimmerman Application April 2, 1953, Serial No. 346,432

8 Claims. (Cl. 146—88)

This invention relates to a machine for sawing meat and, more particularly, to a machine in which a piece of meat is moved into engagement with a power operated saw blade to cut a slice therefrom.

The general object is to provide, in a machine of the above character, a novel means for cleaning the slice of meat automatically as an incident to the cutting of the slice.

A more detailed object is to employ stationary cleaning members which are disposed on opposite sides of the path followed by the slice during the cutting operation and which engage and clean the side surfaces of the slice as the meat is advanced through the machine.

Another object is to provide cleaning members which engage the cut surfaces of both the slice and the piece of meat from which the slice is cut so that all of the surfaces are cleaned during the slicing operation.

The invention also resides in the novel construction and arrangement of the cleaning members to insure that the surfaces of the slice are wiped clean.

Other objects and advantages of the invention will become apparent from the following detailed description taken in connection with the accompanying drawings, in which Figure 1 is a fragmentary perspective view of a meat sawing machine embodying the novel features of the present invention.

Fig. 2 is an enlarged fragmentary top view of the machine.

Fig. 3 is a perspective view of one of the cleaning members.

For the purposes of illustration, the invention is shown in the drawings embodied in a conventional band saw in which the saw blade 5 is in the form of an endless band driven continuously by a suitable motor (not shown), the cutting portion of the blade being vertically disposed and projecting through a slot 6 in the table top 7 of the machine. A piece 8 (Fig. 2) of meat to be sliced is placed on a flat carriage 9 which is disposed alongside the saw blade to form a continuation of the table top 7 and slides on horizontal ways 10 on the frame 11 of the machine to advance the meat into the blade and cut off a slice 12. To guide the meat as it is cut, one end of the piece 8 is placed against a flat guide plate 13 upstanding from the table top 7 with one side facing generally toward and spaced laterally from the saw blade 5. The guide 13 is supported on the frame 11 by a bracket 14 which is secured to the back of the guide and slides on a horizontal bar 15 extending along the front of the machine perpendicularly to the guide plate so that the latter may be moved toward and away from the saw blade to vary the thickness of the slice 12. After being adjusted, the guide may be held in posiiton by a thumb screw 16 threaded through the bracket 14 and bearing against the bar 15.

As the meat is being cut, the exposed surfaces pick up foreign matter, particularly bone dust, which must be removed before the meat is sold. To simplify the removal of this foregin matter and reduce the time required to prepare the meat, the present invention contemplates the provision of a novel means for cleaning both sides of the slice 12 automatically as an incident to the cutting of the slice from the piece 8. This means may comprise two cleaning members 17 and 18 which are disposed on opposite sides of the path followed by the slice 12 during the cutting of the meat and which engage and clean the two cut surfaces of the slice as the meat is advanced through the machine. Preferably, each cleaning member presents a substantially scourer-like flat surface 19 to the slice and is somewhat resilient and yieldable to obtain a brushing action, so that the bone dust is wiped rather than scraped from the meat. A rather heavy fabric or pile-like material, such the sheepskin strips shown in the drawings, has been found satisfactory to produce the desired brushing or wiping action.

In the present instance, advantage is taken of the fact that the outer surface of the slice 12 slides across the guide 13 by mounting the cleaning member 17, which cleans this side of the slice, directly on the guide. For this purpose, the cleaning member 17 is a rectangular piece of sheepskin or the like as wide as but somewhat longer than the guide plate 13 to cover the face of the latter with the ends of the cleaner bent around the ends of the plate as shown in Fig. 2. The cleaner may be held in place on the guide by flexible bands 20 sewn to the back of the sheepskin at each end of the cleaner to provide a loop which may be hooked over studs 21 projecting from the back of the guide plate. With the sheepskin cleaner 17 covering the face of the guide plate, the end of the piece 8 of meat, that is, the outer side of the slice 12, rubs across the cleaner during the cutting operation so that the cleaner wipes the bone dust and loose foreign matter from this side of the slice. When the cleaner becomes dirty, it may easily be removed from the guide and rinsed after which it is ready to be used again.

The second cleaning member 18 is disposed behind the saw blade 5 where the piece 8 of meat and the slice 12 pass on opposite sides of this member and the latter faces outwardly generally toward the first cleaner 17 to engage and clean the inner side of the slice. Herein, the cleaning member 18 is similar to the cleaner 17 and is formed by a rectangular piece of sheepskin covering one side of a flat plate 22 upstanding from the table top 7 behind the blade 5 and suitably secured to the former as by clamping or welding. As in the case of the cleaner 17, flexible bands 23 projecting from the ends of the sheepskin 18 are hooked over studs 24 on the back of the supporting plate 22 to hold the cleaner in place while permitting the cleaner to be removed and washed. The plate 22 may be slanted away from the plane of the blade 5 slightly as shown in Fig. 2 to bend the slice 12 away from the piece 8 of meat as the slice is cut and to insure that the slice engages and rubs across the cleaner 18.

If desired, a third cleaner 25 may be provided to engage and clean the end of the remaining piece of meat so that all the cut surfaces of the meat are cleaned each time a slice is sawed off. To this end, the cleaner 25 is disposed behind the saw blade 5 in back to back relation to the cleaner 18 so as to be engaged by the end of the piece 8 after the slice is cut. This cleaner may also be a rectangular piece of sheepskin stretched across the face of a second upright supporting plate 26 mounted on the table top 7 in back of the plate 22, the two plates being connected by a bracket 27 (Fig. 2) to form a unitary V-shaped structure, and, like the other cleaners, it may be detachably held in place by bands 28 which in this case are looped through slots 29.

It will be observed that, with the foregoing arrangement, the two cleaning members 17 and 18 remove the bone dust and foreign matter from both sides of the slice 12 automatically as the meat is being cut. As a result, it is not necessary to employ a separate cleaning operation and, therefore, the time and labor required to prepare the meat is reduced materially. By using cleaners having a flat yieldable surface engaging the meat, the meat is wiped clean effectively and efficiently. When the third cleaner 25 is included, all of the cut surfaces on the meat are cleaned each time the meat is sliced.

I claim as my invention:

1. A machine for sawing meat having, in combination, a base, a saw blade mounted on said base, a part movable relative to said base to support a piece of meat for movement into said blade to cut a slice from said piece, first and second cleaning members stationarily mounted on said base behind said blade in back to back relation and facing laterally of the blade in opposite directions, and a third cleaning member on said base spaced laterally away from said blade and facing generally toward the blade, said cleaning members engaging respectively, the cut end surface of said piece, the inner surface of said slice and the outer surface of the slice to clean the three surfaces simultaneously with the slicing of the meat.

2. In a machine for slicing meat, the combination of, a base, a saw blade mounted on said base, a part movable relative to said base to support a piece of meat for movement into said blade thereby to cut a slice from the piece, a first rigid member stationarily mounted on said base behind said saw blade and having a generally flat surface facing laterally of the blade, a second and similar member on said base disposed to one side of said blade and having a flat surface facing toward said blade and opposing the surface of said first member whereby the slice as it is cut from said piece passes between said surfaces, and cleaning material covering both of said surfaces and engaging said slice to wipe both sides of the slice as an incident to the cutting of the meat by the saw.

3. In a machine for sawing meat, the combination of, a base, a saw blade mounted on said base, an element movable relative to said base to support a piece of meat for movement into said blade thereby to cut a slice from the piece, a stationary cleaning member disposed on said base behind said blade whereby the piece of meat and the slice pass on opposite sides of the member, said member having a part engageable with the inner side of the slice to clean the same during movement of the piece of meat into said blade, and a second and similar cleaning member stationarily mounted on said base and having a part engaging the outer side of the slice.

4. In a machine for slicing meat, the combination of, a base, a cutter mounted on said base, a part movable relative to said base to support a piece of meat for movement into engagement with said cutter to cut a slice from the piece, and two stationary cleaning members disposed on said base alongside the path of the slice on opposite sides of the same and engageable with the side surfaces of the slice to clean the latter as an incident to the movement of the piece of meat through the machine.

5. In a machine for slicing meat, the combination of, a base, a cutter mounted on said base, a part movable relative to said base to support a piece of meat and advancing the same into engagement with said cutter to cut a slice from said piece, and two stationary cleaning members disposed on said base behind said cutter in back to back relation and facing laterally of the cutter and in opposite directions to engage and wipe the inner surface of said slice and the end of said piece automatically as an incident to cutting the slice.

6. In a machine for slicing meat, the combination of, a base, a cutter blade mounted on said base, an element movable relative to said base to support a piece of meat for movement into said blade to cut a slice from said piece, and a rigid member mounted on said base and disposed alongside the path followed by the slice during the cutting of the piece of meat, said member having a substantially flat scourer-like surface generally paralleling said path to engage one side of a slice during the cutting of the meat to clean that side as an incident to said cutting.

7. A machine for slicing meat as defined in claim 6 in which said member is spaced laterally from the plane of said blade and which includes means adjustably mounted on said member for movement toward and away from said plane whereby the member determines the thickness of said slice and cleans the outside of said slice as an incident to the cutting of the meat.

8. A machine for slicing meat as defined in claim 6 in which said member is composed of a flat plate in a plane disposed alongside said path and of a pile-like material detachably mounted on said plate to cover one side thereof and constitute said surface.

References Cited in the file of this patent

UNITED STATES PATENTS

| | | |
|---|---|---|
| 487,446 | Murphy | Dec. 6, 1892 |
| 1,825,712 | Campbell | Oct. 6, 1931 |
| 1,960,421 | Van Berkel | May 29, 1934 |
| 2,127,861 | Gandriaut | Aug. 23, 1938 |
| 2,280,621 | Biro | Apr. 21, 1942 |

FOREIGN PATENTS

| | | |
|---|---|---|
| 748,420 | France | Apr. 18, 1933 |